United States Patent
Fu et al.

(10) Patent No.: US 7,196,919 B2
(45) Date of Patent: Mar. 27, 2007

(54) NEUTRAL POINT CONTROLLER, METHOD OF CONTROLLING AND RECTIFIER SYSTEM EMPLOYING THE CONTROLLER AND THE METHOD

(75) Inventors: Minghua Fu, Plano, TX (US); Joao L. Andres, Mesquite, TX (US); Jacob Scaria, Mesquite, TX (US)

(73) Assignee: Tyco Electronics Power Systems, Inc., Mesquite, TX (US)

( * ) Notice: Subject to any disclaimer, the term of this patent is extended or adjusted under 35 U.S.C. 154(b) by 53 days.

(21) Appl. No.: 11/089,597

(22) Filed: Mar. 25, 2005

(65) Prior Publication Data
US 2006/0215425 A1 Sep. 28, 2006

(51) Int. Cl.
*H02M 7/68* (2006.01)

(52) U.S. Cl. .............................. 363/98; 363/43; 363/37

(58) Field of Classification Search ............ 363/34–41, 363/132, 43, 95, 98, 84, 87, 89; 318/801, 318/811
See application file for complete search history.

(56) References Cited

U.S. PATENT DOCUMENTS 6,031,738 A * 2/2000 Lipo et al. ................. 363/37

* cited by examiner

Primary Examiner—Rajnikant B. Patel

(57) ABSTRACT

The present invention provides a neutral point controller for use with a three level rectifier. In one embodiment, the neutral point controller includes a primary drive circuit configured to provide primary drive signals for the three level rectifier thereby establishing output voltages having a common neutral point. Additionally, the neutral point controller also includes a current balancing compensator coupled to the primary drive circuit and configured to maintain the common neutral point within a predefined voltage by adjusting the primary drive signals based on a current balancing feedback signal. In an alternative embodiment, the neutral point controller further includes a duty cycle compensator coupled to the current balancing compensator and configured to maintain the common neutral point within the predefined voltage by adjusting the primary drive signals based on a direct balancing pulse width modulation signal.

18 Claims, 5 Drawing Sheets

PATENT

NEUTRAL POINT CONTROLLER, METHOD OF CONTROLLING AND RECTIFIER SYSTEM EMPLOYING THE CONTROLLER AND THE METHOD

TECHNICAL FIELD OF THE INVENTION

The present invention is directed, in general, to a power converter and, more specifically, to a neutral point controller, a method of controlling a neutral point voltage and a rectifier system employing the controller or the method.

BACKGROUND OF THE INVENTION

A three phase, three level rectifier converts three phase input voltage signals into two output DC voltages that employ a common connection typically called a neutral point. This type of rectifier is often used in relative higher line voltage applications and provides a salient advantage in that the reverse voltage across the rectifying switches is reduced to half of the total output voltage or bus voltage. A common challenge in this type of multilevel converter topology is the problem of a voltage imbalance that often arises between the two output DC voltages.

This voltage imbalance can occur due to the two output DC voltages having different load currents thereby causing one output DC voltage to be a greater portion of the bus voltage than the other. This condition can also be caused by switching delays due to control errors, offsets and sensing problems. Ideally, the neutral point should be zero volts. However, voltage imbalance causes the neutral point voltage to drift or float thereby exacerbating regulation and control problems.

A hardware balancing circuit is often used to force the neutral point to be maintained at approximately zero volts. The hardware balancing circuit typically uses at least two balancing switches and an inductor connected across the output DC voltages. The balancing switches must be rated to withstand the entire bus voltage, often making them relatively expensive to use as is their added control and bias circuitry. The balancing switches also waste power and therefore reduce overall efficiency. Additionally, if the inductor should saturate due to an unusual load condition, reliability of the rectifier can be affected.

Accordingly, what is needed in the art is a more effective way to balance the neutral point voltage.

SUMMARY OF THE INVENTION

To address the above-discussed deficiencies of the prior art, the present invention provides a neutral point controller for use with a three level rectifier. In one embodiment, the neutral point controller includes a primary drive circuit configured to provide primary drive signals for the three level rectifier thereby establishing output voltages having a common neutral point. Additionally, the neutral point controller also includes a current balancing compensator coupled to the primary drive circuit and configured to maintain the common neutral point within a predefined voltage by adjusting the primary drive signals based on a current balancing feedback signal.

In another aspect, the present invention provides a method of controlling a neutral point voltage for use with a three level rectifier. The method includes providing primary drive signals for the three level rectifier thereby establishing output voltages having a common neutral point and maintaining the common neutral point within a predefined voltage by adjusting the primary drive signals based on a current balancing feedback signal.

The present invention also provides, in yet another aspect, a rectifier system. The rectifier system includes a three level rectifier that employs a three phase input signal and provides output voltages having a common neutral point. The rectifier system also includes a neutral point controller having a primary drive circuit that provides primary drive signals for the three level rectifier, and a current balancing compensator, coupled to the primary drive circuit, that maintains the common neutral point within a predefined voltage by adjusting the primary drive signals based on a current balancing feedback signal.

In an alternative embodiment, the neutral point controller further includes a duty cycle compensator coupled to the current balancing compensator and configured to maintain the common neutral point within the predefined voltage by adjusting the primary drive signals based on a direct balancing pulse width modulation signal.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
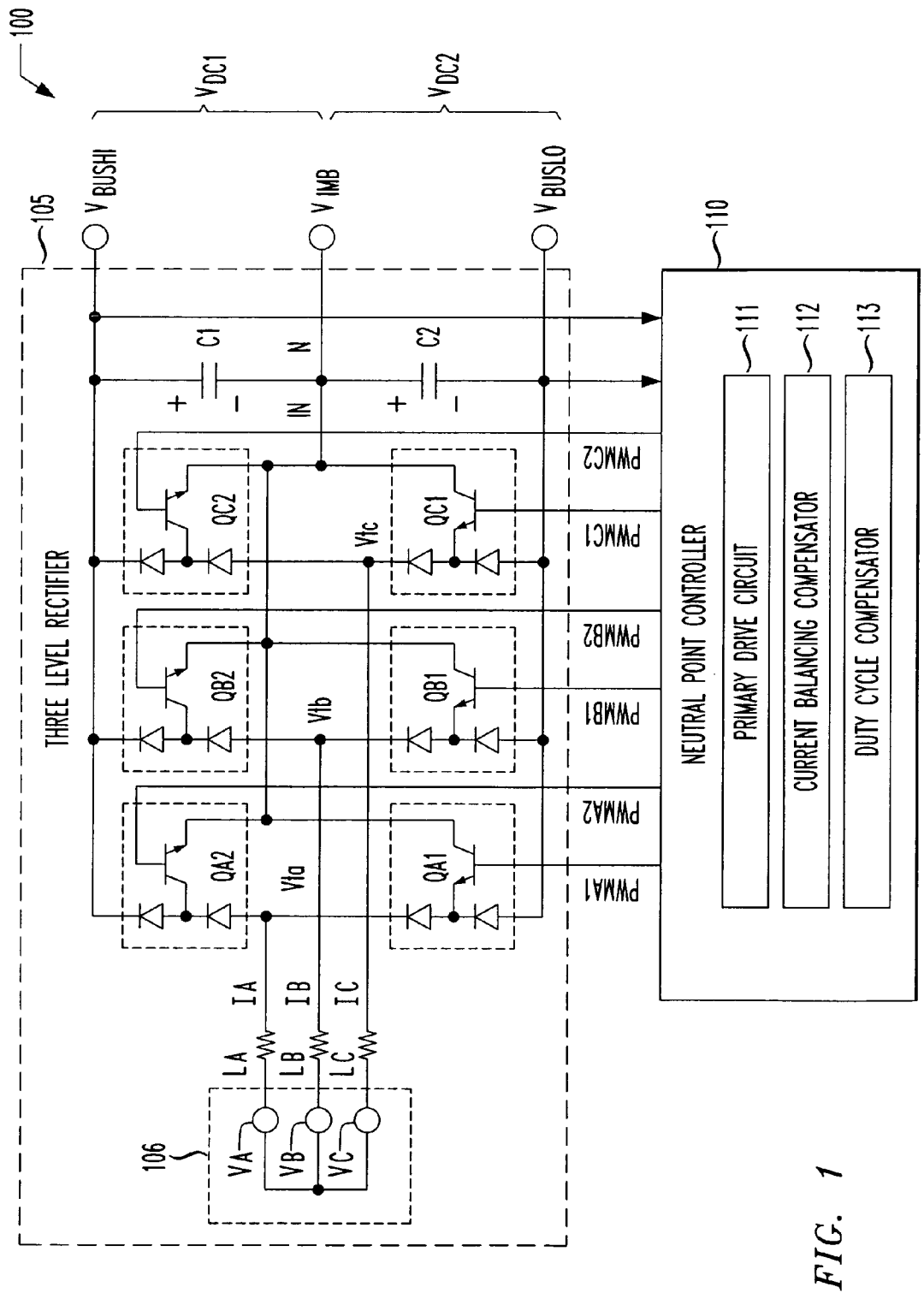
FIG. 1 illustrates a system diagram of an embodiment of a three level rectifier system constructed in accordance with the principles of the present invention.

Referring initially to FIG. 1, illustrated is a system diagram of an embodiment of a three level rectifier system, generally designated 100, constructed in accordance with the principles of the present invention. The three level rectifier system 100 includes a three level rectifier 105 and a neutral point controller 110. The three level rectifier 105 employs a three phase input voltage source 106 to supply first, second and third phase voltages $V_A$, $V_B$, $V_C$. This input voltage source is converted into two DC output voltages $V_{DC1}$, $V_{DC2}$ having polarities as shown. The phase voltages $V_A$, $V_B$, $V_C$ are sinusoidal and have a phase separation of about 120 degrees. The neutral point controller 110 employs a rectifier output bus voltage VBUS to provide primary drive signals for the three level rectifier 105 associated with the three input phase voltages $V_A$, $V_B$, $V_C$, respectively.

The three level rectifier 105 includes first, second and third boost inductors $L_A$, $L_B$, $L_C$, first, second and third negative voltage rectifiers $Q_{A1}$, $Q_{B1}$, $Q_{C1}$, first, second and third positive voltage rectifiers $Q_{A2}$, $Q_{B2}$, $Q_{C3}$ and first and second filter capacitors C1, C2. The three level rectifier 105 operates as a boost circuit and provides power factor (PF) correction to supply substantially sinusoidal AC currents $I_A$, $I_B$, $I_C$. The negative voltage rectifiers $Q_{A1}$, $Q_{B1}$, $Q_{C1}$ provide current conduction during a portion of the negative waveform of the input phase voltages $V_A$, $V_B$, $V_C$, respectively. Correspondingly, the positive voltage rectifiers $Q_{A2}$, $Q_{B2}$, $Q_{C2}$ provide current conduction during a corresponding portion of the positive waveform of the input phase voltages $V_A$, $V_B$, $V_C$, respectively.

The two DC output voltages $V_{DC1}$, $V_{DC2}$ are provided between the rectifier output bus voltage $V_{BUS}$, consisting of high and low bus voltages $V_{BUSHI}$, $V_{BUSLO}$, and a common neutral point bus N, which provides a neutral point current $I_N$ associated with conduction of each of the voltage rectifiers. Proper operation of the three level rectifier system 100 requires that a common neutral point imbalance voltage $V_{IMB}$ remain sufficiently close to ground potential thereby causing the two DC output voltages $V_{DC1}$, $V_{DC2}$ to remain substantially equal for all load current conditions.

In the illustrated embodiment, the neutral point controller 110 includes a primary drive circuit 111, a current balancing compensator 112 and a duty cycle compensator 113. The primary drive circuit 111 provides the primary drive signals as part of first, second and third pairs of pulse width modulated (PWM) control signals PWMA1/PWMA2, PWMB1/PWMB2, PWMC1/PWMC2. The current balancing compensator 112 is coupled to the primary drive circuit 111 and maintains the common neutral point N within a predefined voltage by adjusting the primary drive signals based on a current balancing feedback signal. The predefined voltage is typically less than about 10 volts for an 800 volt rectifier output bus voltage $V_{BUS}$. The duty cycle compensator 113 is coupled to the current balancing compensator 112 and also maintains the common neutral point N within the predefined voltage by adjusting the primary drive signals based on a direct balancing pulse width modulation signal.

The primary drive circuit 111 employs a feedback loop to compare the rectifier output bus voltage $V_{BUS}$, which is a summation of the two DC output voltages $V_{DC1}$, $V_{DC2}$, to a reference voltage to regulate the primary drive signals. The current balancing compensator 112 employs a difference between the DC output voltages $V_{DC1}$, $V_{DC2}$, to adjust these primary drive signals and maintain the neutral point voltage $V_N$ within the 10 volt predefined level, especially for output load currents that are greater than about 20 percent of rated load current. The duty cycle compensator 113 employs the direct balancing pulse width modulation signal to provide a direct adjustment to the PWM control signals PWMA1/PWMA2, PWMB1/PWMB2, PWMC1/PWMC2, especially for output load currents that are less than about 20 percent of rated load current.

Figure 2:
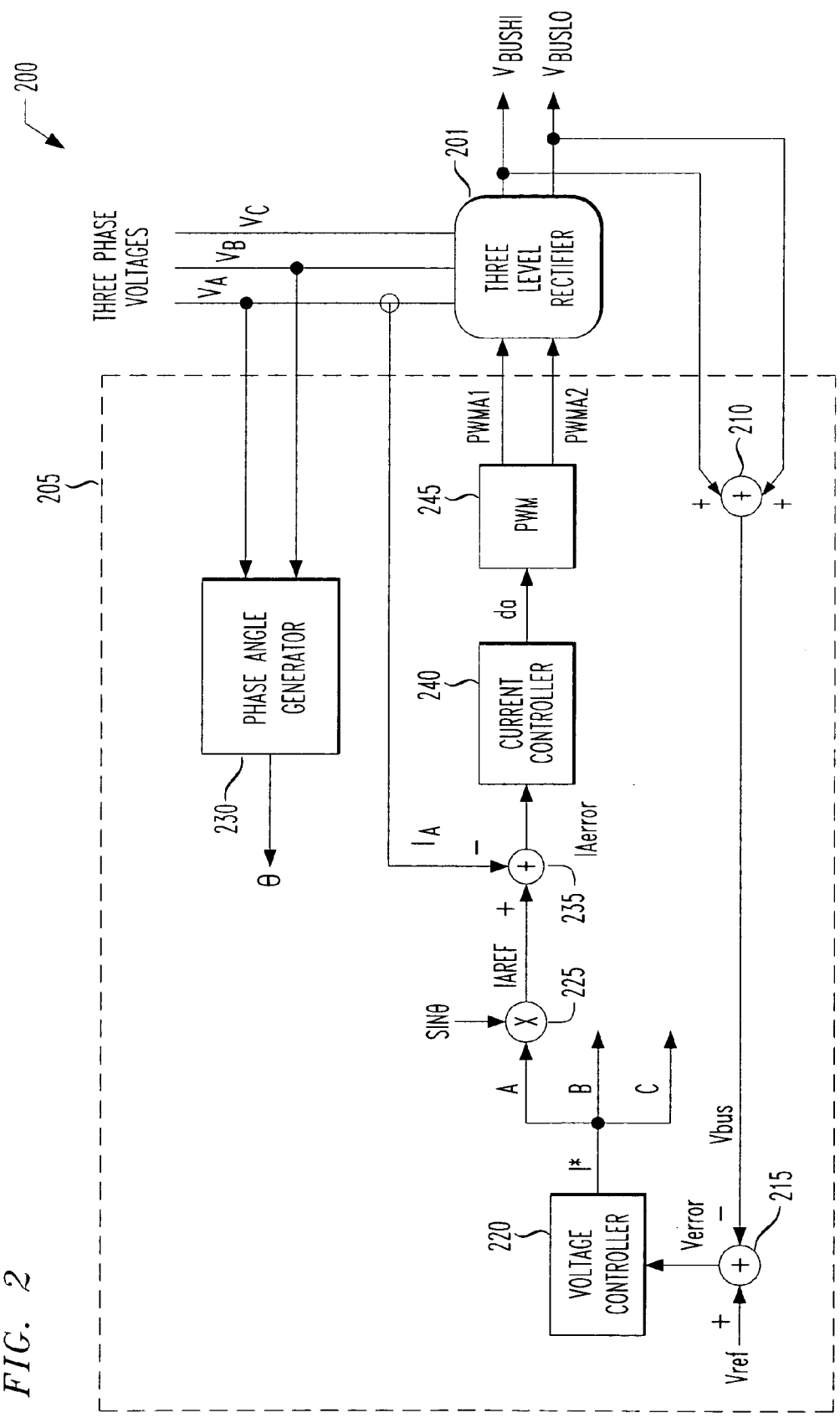
FIG. 2 illustrates an alternative diagram of a three level rectifier system, generally designated 200, showing primary drive circuitry employing voltage and current control for power factor correction.

Turning now to FIG. 2, illustrated is an alternative diagram of a three level rectifier system, generally designated 200, showing primary drive circuitry employing voltage and current control for PF correction. The three level rectifier system 200 includes a three level rectifier 201 and a primary drive circuit 205 coupled to it. The three level rectifier 201 converts three phase voltages $V_A$, $V_B$, $V_C$ into high and low bus voltages $V_{BUSHI}$, $V_{BUSLO}$ to provide a bus voltage $V_{BUS}$, as discussed with respect to FIG. 1. The primary drive circuit 205 employs the high and low bus voltages $V_{BUSHI}$, $V_{BUSLO}$ to derive PWM control signals associated with each of three phase voltages $V_A$, $V_B$, $V_C$. FIG. 2 provides a more detailed operation for the primary drive circuit 205 associated with phase voltage $V_A$, which is typical of the three primary drive circuits required.

The primary drive circuit 205 includes first, second and third summing junctions 210, 215, 235, a voltage controller 220, a multiplier 225, a phase angle generator 230, a current controller 240 and a pulse width modulator 245. The first summing junction provides a summation of the high and low bus voltages $V_{BUSHI}$, $V_{BUSLO}$, which corresponds to the rectifier output bus voltage $V_{BUS}$. The second summing junction 215 provides an error voltage $V_{ERROR}$ that represents a difference between a reference voltage $V_{REF}$ and the rectifier output bus voltage $V_{BUS}$. In the illustrated embodiment, the reference voltage $V_{REF}$ is about 800 volts and determines the output bus voltage $V_{BUS}$. The voltage controller 220 converts the error voltage $V_{ERROR}$ into a general reference current I* that is provided to three primary drive circuits A, B, C associated with each of three phase voltages $V_A$, $V_B$, $V_C$.

For the phase voltage $V_A$, a phase reference current $I_{AREF}$ is provided by the multiplier 225 employing the general reference current I* and a function sin θ, for a phase angle θ. The phase angle generator 230 provides zero crossing and phase detection information between first and second phase voltages $V_A$, $V_B$ in the form of the phase angle θ. The third summing junction 235 provides an error current $I_{AERROR}$ for the phase voltage $V_A$ employing the phase reference current $I_{AREF}$ and a substantially sinusoidal AC current $I_A$ associated with the phase voltage $V_A$.

The current controller 240 employs the phase reference current $I_{AREF}$ to provide a duty cycle control function $d_a$. The pulse width modulator 245 converts the duty cycle control function $d_a$ into a pair of PWM control signals PWMA1/PWMA2 associated with negative and positive voltage rectifiers for the phase voltage $V_A$, respectively. The PWM control signals PWMA1/PWMA2 provide regulation of the rectifier output bus voltage $V_{BUS}$, which represents a summation of two DC output voltages provided by the three level rectifier 201.

Figure 3:
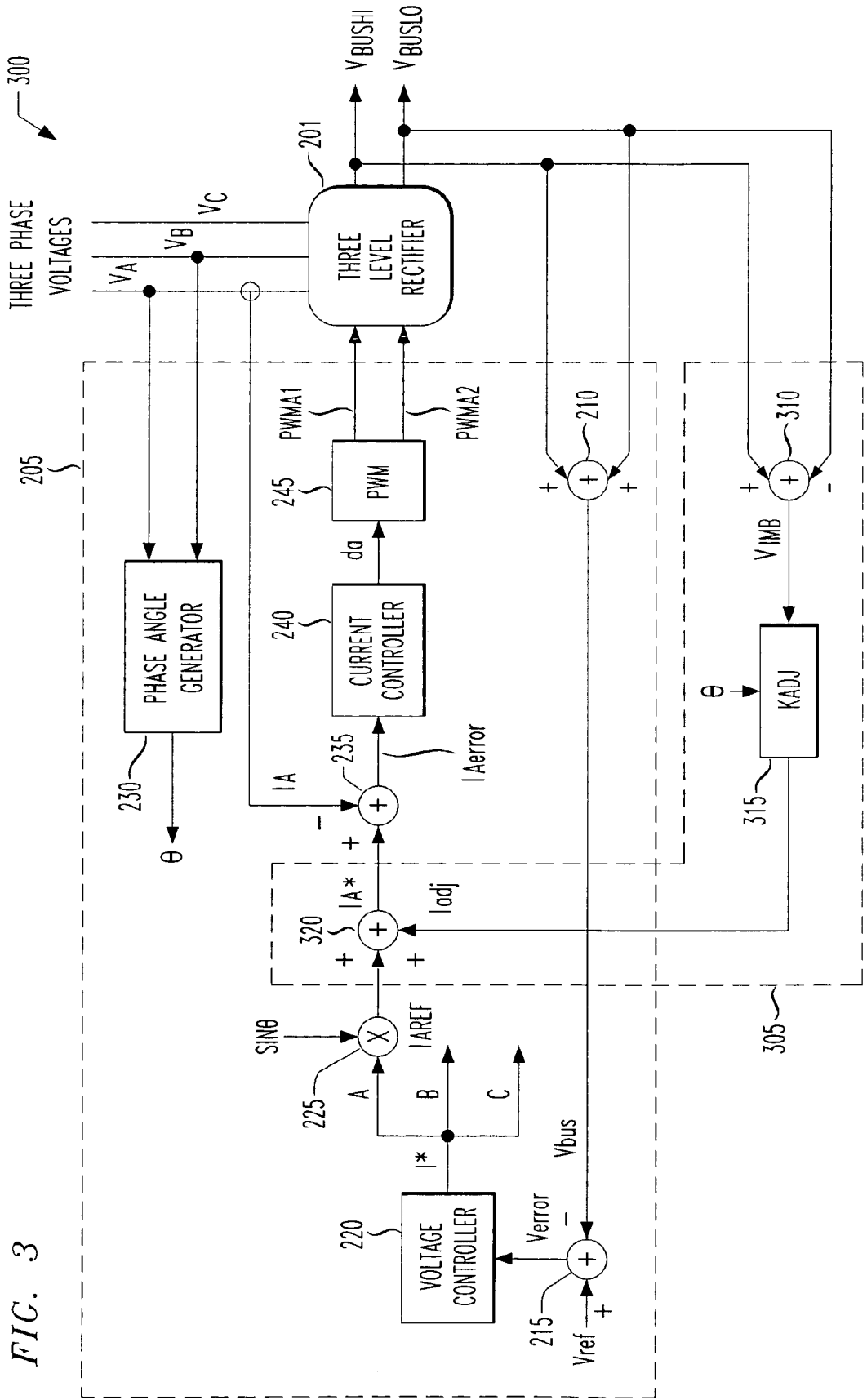
FIG. 3 illustrates another diagram of a three level rectifier system employing current balancing compensation constructed in accordance with the principles of the present invention.

Turning now to FIG. 3, illustrated is another diagram of a three level rectifier system, generally designated 300, employing current balancing compensation constructed in accordance with the principles of the present invention. The three level rectifier system 300 includes a three level rectifier 201 as discussed with respect to FIG. 1. The three level rectifier system 300 also includes a primary drive circuit 205, as discussed with respect to FIG. 2, and a current balancing compensator 305, coupled to the primary drive circuit 205, that form an embodiment of a neutral point controller. The current balancing compensator 305 maintains a common neutral point between two DC output voltages within a predefined voltage.

The current balancing compensator 305 includes first and second current compensation summing junctions 310, 320 and a current compensation factor $K_{adj}$ that is dependent on the phase angle θ, wherein the phase angle θ was defined with respect to FIG. 2. The first summing junction 310 provides a common neutral point imbalance voltage $V_{IMB}$ employing the high and low bus voltages $V_{BUSHI}$, $V_{BUSLO}$. For each input phase voltage of the three level rectifier 201 and with continued reference to FIG. 1, an inward flowing current charges the first filter capacitor C1, and an outward flowing current charges the second filter capacitor C2. Then, the common neutral point imbalance voltage $V_{IMB}$ may be defined as:

$$V_{IMB} = V_{C2} - V_{C1} \quad (1)$$

where $V_{C1}$ and $V_{C2}$ are the voltages across the first and second filter capacitors C1, C2, respectively.

Then, a current balancing feedback signal $I_{adj}$ may be employed for phase voltage $V_A$ and defined as:

$$I_{adj} = k_{adj} \cdot V_{IMB}. \quad (2)$$

Generally, adjusted reference currents $I_A^*$, $I_B^*$, $I_C^*$ for each phase may be written as:

$$I_A^* = I_{AREF} + I_{adj},$$

$$I_B^* = I_{BREF} + I_{adj}, \text{ and}$$

$$I_C^* = I_{CREF} + I_{adj}, \quad (3)$$

Since the current balancing feedback signal $I_{adj}$ corresponds to a common mode current, it typically involves a minimal power contribution while affecting adjustment for the common neutral point imbalance voltage $V_{IMB}$.

In the illustrated embodiment, the current balancing feedback loop employed by the current balancing compensator 305 is very effective when the load current is greater than about 20 percent of the rated load. However, when the load current is less than about 20 percent of the rated load, regulation afforded by the current balancing feedback loop may diminish thereby causing the common neutral point imbalance voltage $V_{IMB}$ to tend to drift outside of a predefined voltage.

Figure 4:
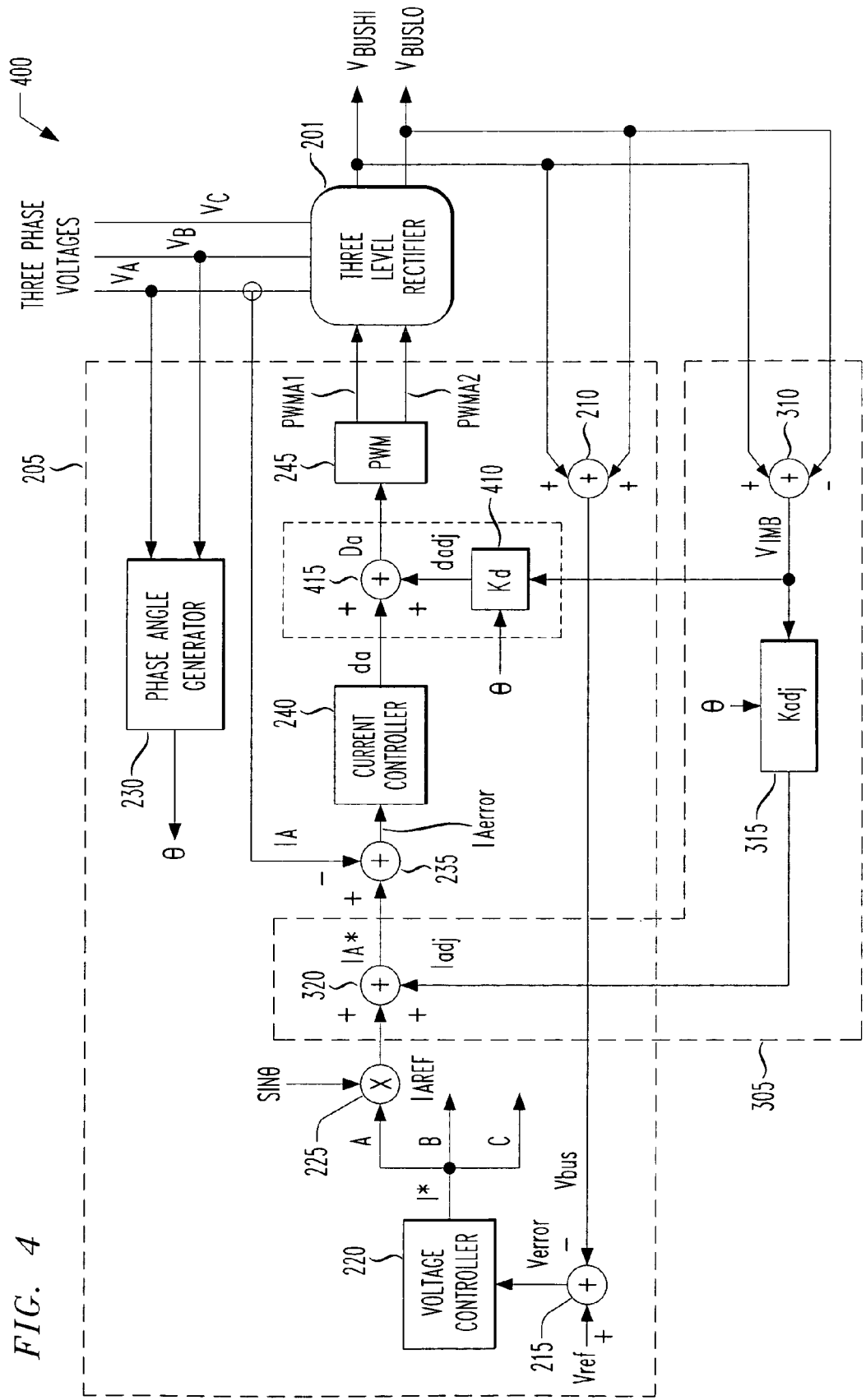
FIG. 4 illustrates a diagram of another embodiment of a three level rectifier system employing duty cycle compensation constructed in accordance with the principles of the present invention.

Turning now to FIG. 4, illustrated is a diagram of another embodiment of a three level rectifier system, generally designated 400, employing duty cycle compensation constructed in accordance with the principles of the present invention. The three level rectifier system 400 includes the three level rectifier 201 as discussed with respect to FIG. 1. The three level rectifier system 400 also includes the primary drive circuit 205, the current balancing compensator 305 and a duty cycle compensator 405, coupled to the current balancing compensator 305, that form an embodiment of a neutral point controller. The duty cycle compensator 405 also maintains the common neutral point between two DC output voltages within a predefined voltage.

The duty cycle compensator 405 includes a duty cycle compensation factor $K_d$ that is dependent on the phase angle θ, and a duty cycle summing junction 415. The duty cycle compensation factor $K_d$ provides a direct balancing pulse width modulation signal $d_{adj}$ based on the common neutral point imbalance voltage $V_{IMB}$. Therefore, the direct balancing pulse width modulation signal $d_{adj}$ may be defined as:

$$d_{adj} = k_d \cdot V_{IMB}. \quad (4)$$

For each phase, the duty cycle is modified as follows:

$$D_a = d_a + d_{adj}$$

$$D_b = d_b + d_{adj}$$

$$D_c = d_c + d_{adj} \quad (5)$$

where $d_a$, $d_b$ and $d_c$ are the duty cycle control functions from current balancing and $D_a$, $D_b$ and $D_c$ are adjusted duty cycles for each of the corresponding phase voltages to be applied to the three level rectifier 201.

The direct balancing pulse width modulation signal $d_{adj}$ provides another way of balancing the common neutral point imbalance voltage $V_{IMB}$. Its balancing effect is independent of the current balancing loop and therefore does not rely on the performance of the current balancing loop. For example, a positive offset injected directly into the duty cycle during a positive half cycle of the phase voltages tends to charge the first filter capacitor C1. Correspondingly, a negative offset injected directly into the duty cycle during a negative half cycle of the phase voltages tends to discharge the first filter capacitor C1. Of course, the converse of this action also applies to the second filter capacitor C2.

It may be noted that during high values of output load current, directly injecting an offset into the PWM duty cycle may cause unacceptable distortions in the phase currents since current balancing compensation is being directly bypassed. However, an operational combination of current balancing and direct balancing PWM compensation provides an advantageous solution. Direct balancing PWM compensation may be employed during standby or light output load current operations and disabled when there is sufficient output load current. Then, in normal to high output current load operations, current balancing compensation may be employed to maintain the common neutral point imbalance voltage $V_{IMB}$ within the predefined voltage. Employing a current compensation factor $K_{adj}$ and a duty cycle compensation factor $K_d$ that are sensitive to output load current conditions allows implementation of this control strategy.

Figure 5:
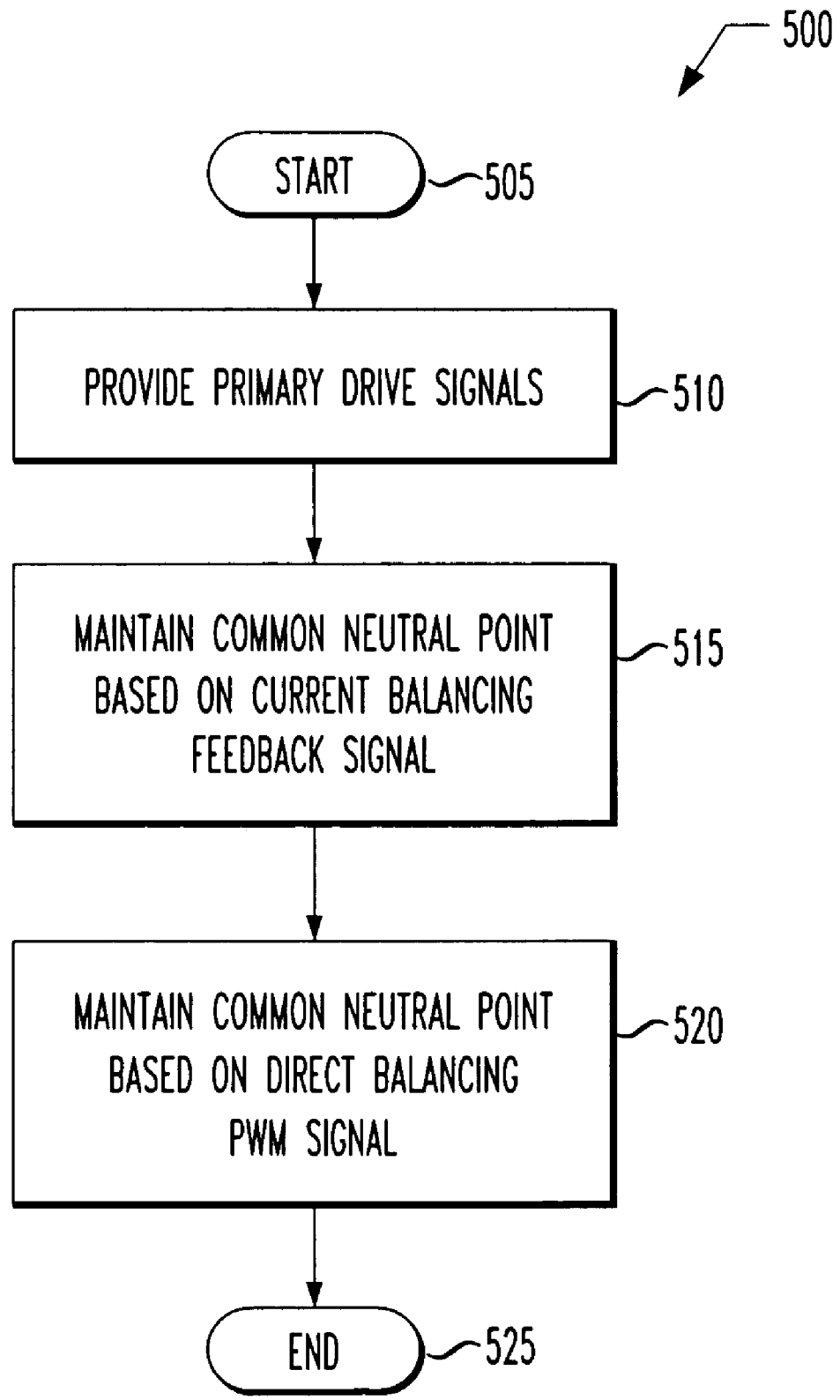
FIG. 5 illustrates a flow diagram of an embodiment of a method of controlling a neutral point voltage carried out in accordance with the principles of the present invention.

Turning now to FIG. 5, illustrated is a flow diagram of an embodiment of a method of controlling a neutral point voltage, generally designated 500, carried out in accordance with the principles of the present invention. The method 500 starts in a step 505 and is employed with a three level rectifier. Then, in a step 510, primary drive signals are provided for the three level rectifier thereby establishing output voltages corresponding to a bus voltage having a common neutral point. The primary drive signals employ a reference voltage and pulse width modulation signals to regulate the bus voltage.

The common neutral point is maintained within a predefined voltage range by adjusting the primary drive signals based on a current balancing feedback signal, in a step 515. The current balancing feedback signal employs a difference in the output voltages to maintain the common neutral point within the predetermined voltage range. Then, in a step 520, the common neutral point is further maintained within the predetermined voltage range based on directly balancing the pulse width modulation signals where a direct adjustment is made to the duty cycle without relying on the current balancing feedback signal. The method 500 ends in a step 525.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

In summary, embodiments of the present invention employing a neutral point controller, a method of controlling a voltage and a rectifier system employing the controller or the method have been presented. Advantages include the capability to control a common neutral point voltage associated with balancing two output voltages. Both current adjustment feedback and direct duty cycle modification may be employed to maintain the common neutral point voltage within an acceptable predetermined voltage range for an overall operational output load current ranging from no-load to full-load.

Although the present invention has been described in detail, those skilled in the art should understand that they can make various changes, substitutions and alterations herein without departing from the spirit and scope of the invention in its broadest form.

What is claimed is:

1. A neutral point controller for use with a three level rectifier, comprising:
   a primary drive circuit configured to provide primary drive signals for said three level rectifier thereby establishing output voltages having a common neutral point; and
   a current balancing compensator coupled to said primary drive circuit and configured to maintain said common neutral point within a predefined voltage by adjusting said primary drive signals based on a current balancing feedback signal, wherein said current balancing feedback signal employs a difference between said output voltages.

2. The controller as recited in claim 1 wherein said primary drive signals employ a summation of said output voltages and a reference voltage to regulate said output voltages.

3. The controller as recited in claim 1 wherein said primary drive signals are pulse width modulation signals.

4. The controller as recited in claim 1 wherein said predefined voltage is less than about 10 volts.

5. A neutral point controller for use with a three level rectifier, comprising:
   a primary drive circuit configured to provide primary drive signals for said three level rectifier thereby establishing output voltages having a common neutral point;
   a current balancing compensator coupled to said primary drive circuit and configured to maintain said common neutral point within a predefined voltage by adjusting said primary drive signals based on a current balancing feedback signal; and
   a duty cycle compensator coupled to said current balancing compensator and configured to maintain said common neutral point within said predefined voltage by adjusting said primary drive signals based on a direct balancing pulse width modulation signal.

6. The controller as recited in claim 5 wherein said direct balancing pulse width modulation signal provides a direct adjustment to said primary drive signals.

7. A method of controlling a neutral point voltage for use with a three level rectifier, comprising:
   providing primary drive signals for said three level rectifier thereby establishing output voltages having a common neutral point; and
   maintaining said common neutral point within a predefined voltage by adjusting said primary drive signals based on a current balancing feedback signal, wherein said current balancing feedback signal employs a difference between said output voltages.

8. The method as recited in claim 7 wherein said primary drive signals employ a summation of said output voltages and a reference voltage to regulate said output voltages.

9. The method as recited in claim 7 wherein said primary drive signals are pulse width modulation signals.

10. The method as recited in claim 7 wherein said predefined voltage is less than about 10 volts.

11. The method as recited in claim 7 further comprising maintaining said common neutral point within said predefined voltage by adjusting said primary drive signals based on a direct balancing pulse width modulation signal.

12. The method as recited in claim 11, wherein said direct balancing pulse width modulation signal provides a direct adjustment to said primary drive signals.

13. A rectifier system, comprising:
    a three level rectifier that employs a three phase input signal and provides output voltages with a common neutral point; and
    a neutral point controller, having:
      a primary drive circuit that provides primary drive signals for said three level rectifier, and
      a current balancing compensator, coupled to said primary drive circuit, that maintains said common neutral point within a predefined voltage by adjusting said primary drive signals based on a current balancing feedback signal, wherein said current balancing feedback signal employs a difference between said output voltages.

14. The system as recited in claim 13, wherein said primary drive signals employ a summation of said output voltages and a reference voltage to regulate said output voltages.

15. The system as recited in claim 13, wherein said primary drive signals are pulse width modulation signals.

16. The system as recited in claim 13, wherein said predefined voltage is less than about 10 volts.

17. A three level rectifier that employs a three phase input signal and provides output voltages with a common neutral point; and
    a neutral point controller, having:
      a primary drive circuit that provides primary drive signals for said three level rectifier
      a current balancing compensator, coupled to said primary drive circuit, that maintains said common neutral point within a predefined voltage by adjusting said primary drive signals based on a current balancing feedback signal; and
      a duty cycle compensator, coupled to said current balancing compensator, that maintains said common neutral point within said predefined voltage by adjusting said primary drive signals based on a direct balancing pulse width modulation signal.

18. The system as recited in claim 17 wherein said direct balancing pulse width modulation signal provides a direct adjustment to said primary drive signals.

* * * * *